Jan. 15, 1935. E. W. BURGESS 1,988,159
SPRINKLER SUPPORT
Filed July 19, 1933

INVENTOR.
Edward W. Burgess
BY
ATTORNEY.

Patented Jan. 15, 1935

UNITED STATES PATENT OFFICE 1,988,159

SPRINKLER SUPPORT

Edward W. Burgess, Milwaukee, Wis.

Application July 19, 1933, Serial No. 681,065

6 Claims. (Cl. 248—29)

This invention relates to a sprinkler support.

The object of the invention is to provide a simple, light, inexpensive and efficient support for a hose having a spray nozzle for sprinkling lawns and gardens.

Another object is to provide such a support which is adjustable to hold the spray nozzle at any desired angle for spraying.

Figure 1:
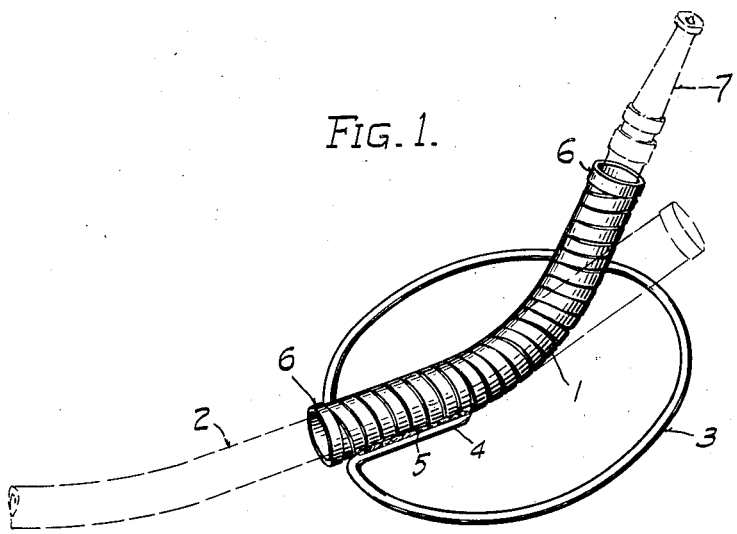
Figure 2:
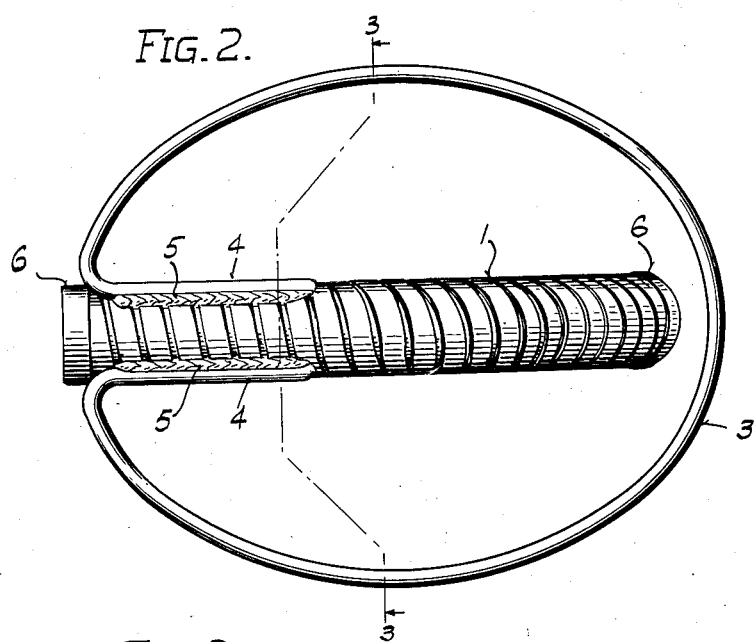
Figure 3:
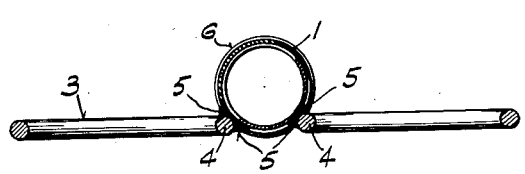

An embodiment of the invention is illustrated in the accompanying drawing in which:

Figure 1 is a perspective view of the support showing the hose and spray nozzle supported thereby, Fig. 2 is a view looking upwardly at the bottom of the support, and Fig. 3 is a transverse section as indicated at line 3—3 of Fig. 2.

The support has a tubular body member 1 preferably of flexible spirally wound metal tubing or sheathing similar to that employed for protecting electric wiring and cables. The member is of such construction as to be rigid except against considerable flexing pressure, in excess of that exerted by the water flowing therethrough under pressure. The body 1 is preferably of a diameter sufficient to receive the hose 2 which is ordinarily of the common garden hose type.

The body 1 is supported on a base 3 preferably constructed of a loop of wire having its end portions 4 curved inwardly along each side of the body 1 and welded or soldered thereto as at 5.

The wire loop support 3 is adapted to rest flat on the ground and to support the tubular body member 1 above it. The loop may be circular, oblong or any suitable shape for the purpose.

One end of the body member 1 terminates near one side or end of the loop adjacent the reentrant curve of the end portions 4 of the wire. This end of the body 1 is held in a horizontal position flat on the end portions 4 of the base 3.

The other end of the body member 1 is free to be positioned in any desired direction by angular adjustment of the body, and extends over the main part of the looped base 3. The body member preferably has ferrule rings 6 at each end.

In use, the garden hose 2 is first inserted through the straight tubular body member 1 of the support in a direction which will dispose the discharge end of the hose at the free end of the body 1. Then the spray nozzle 7 is secured to the discharge end of the hose in the usual manner and the hose pulled back until the nozzle engages the end of the member 1, the latter being preferably of a diameter not permitting the spray nozzle to pass therethrough.

The support is then carried with the hose to the desired location for sprinkling and is placed on the ground. The body member 1 is bent or adjusted to the proper angle, as illustrated in Figure 1, to direct the spray to the desired place.

Various connections may be provided between the support and the hose or spray nozzle within the scope of the invention and the tubular body member may be made a direct carrier for the water, as by connecting the discharge end of the hose to the lower end of the body member and connecting the spray nozzle to the upper end of the member.

I claim:

1. A support for a spray nozzle end hose, comprising a substantially rigid tubular member for receiving the discharge end of the hose and supporting the spray nozzle, said member being capable of free bending to an angle for directing the spray from the nozzle, and means for supporting the member at one end.

2. A support for a spray nozzle and hose, comprising a tubular sheath member for receiving the discharge end of the hose passed therethrough and supporting the spray nozzle, said member being capable of flexing to an angle for directing the spray from the nozzle, and means for supporting said member.

3. A support for a spray nozzle and hose, comprising a tubular member of a diameter for receiving the discharge end of a garden hose passed therethrough and for preventing passage therethrough of a spray nozzle attached to the end of the hose, said member being capable of flexing to an angle for holding and directing the spray nozzle and being sufficiently rigid to retain its adjusted position against pressure from the water flowing through the hose, and means for supporting said member on the ground.

4. A support for a spray nozzle and hose, comprising a metallic tubular member for receiving the discharge end of the hose and supporting the nozzle, the end of the member receiving the hose being secured in horizontal position and the end supporting the nozzle being free for adjustment to hold the nozzle at an angle, and means attached to the horizontal portion of the member for supporting the same on the ground.

5. A support for a spray nozzle and hose, comprising a flexible metallic sheath for receiving the discharge end of the hose and holding the nozzle at an adjusted angle, and a base for supporting said sheath.

6. A support for a lawn spray nozzle comprising, a metallic tubular member of a diameter for receiving the discharge end of a garden hose passed therethrough, said member being capable of flexing to an angle for holding and directing the spray nozzle on the hose and being sufficiently rigid to retain its adjusted position against pressure from the water flowing through the hose, and a wire loop having inturned ends welded to said tubular member to support the same in position.

EDWARD W. BURGESS.